United States Patent Office 2,960,103
Patented Nov. 15, 1960

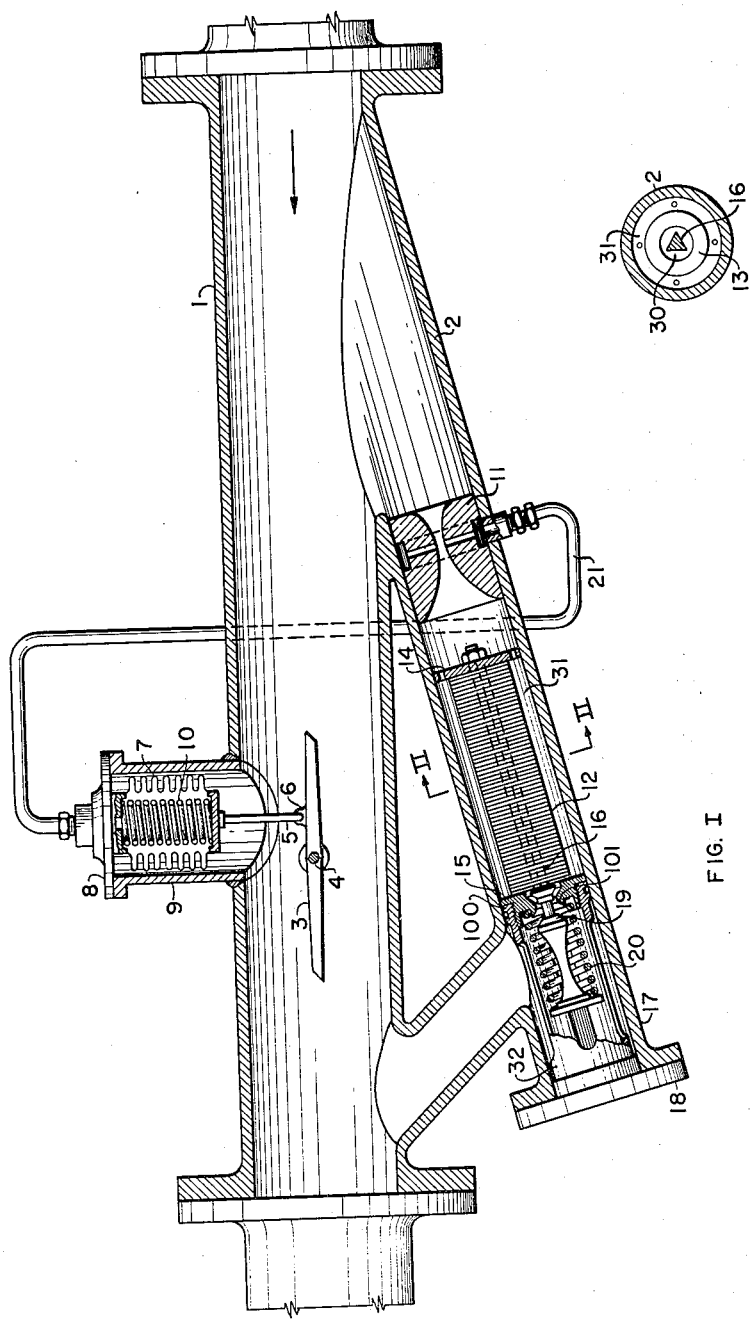

2,960,103

PIPE LINE FLOW METER

Ernest Frederick Winter, Wirral, and James Arthur Wooldridge, Cranley, England, assignors to Shell Oil Company, a corporation of Delaware Original application Mar. 21, 1956, Ser. No. 573,018. Divided and this application Nov. 29, 1957, Ser. No. 703,471

Claims priority, application Great Britain Mar. 23, 1955

1 Claim. (Cl. 137—154)

This application is a division of application Serial No. 573,018, filed on March 21, 1956, which has since matured into patent No. 2,842,152, issued on July 8, 1958.

The present invention relates to liquid pipe lines, and while it is generally applicable to pipe lines for the transfer of liquids which are immiscible or substantially immiscible with water, it is particularly applicable to the pipe lines which are used for the transfer of hydrocarbon fuels from one reservoir to another, for example, for the transfer of aviation fuel from a refuelling tank, truck or a hydrant refuelling system to the storage tanks of an aircraft. Reference to liquids in this specification are to be understood to be confined to those liquids which are immiscible or substantially immiscible with water.

Particularly in cases such as the example quoted in which oil is being delivered to a reservoir from which it is drawn for use as a fuel, it may be important that the oil being delivered should not contain water. However, contamination with water can occur at some stage before delivery and while certain procedures may be laid down for detecting the presence of water in the oil in the reservoir from which it is transferred, and for preventing its transference, an automatic mechanical safeguard to stop the flow of oil as soon as water has been detected is preferred, and it is therefore an object of the present invention to provide apparatus for this purpose.

According to the present invention a liquid pipe line is provided with apparatus responsive to the presence of water in liquid in the pipe line, said apparatus comprising a filter pack of the kind specified (as defined below) located in the path of liquid flowing through an auxiliary channel interconnecting two points spaced along the main liquid flow channel, and means responsive to expansion of the filter pack for indicating the presence of water and/or automatically stopping the flow of liquid through the pipe line.

Reference has been made above to "filter packs of the kind specified." This kind of filter pack is to be understood to be one which consists of a mass of filter material, for example, impregnated filter paper, which mass will permit the passage of liquid other than water through it, but absorbs water carried in the liquid stream, and is so arranged that on so doing it expands sufficiently to produce a mechanical movement sufficient to actuate a suitable form of valve or valve operating mechanism, such as a servo mechanism, and/or the actuating mechanism of an indicating device. The latter may be either electrical, mechanical or hydraulic. One form of filter pack of the kind specified consists of a pack of annular filter papers compressed between end plates and mounted on a triangular section rod passing through the center channel of the pack. Liquid flows through the pack from outside the external cylindrical surface to the center channel within.

According to another aspect of the present invention there is provided a liquid pipe line section adapted to be joined at either end to other sections of pipe line or allied equipment, said section including apparatus responsive to the presence of water in liquid being passed through the section in the normal direction of liquid flow, said apparatus comprising a filter pack of the kind specified located in the path of liquid flowing through an auxiliary channel interconnecting two points spaced along the main liquid flow channel through the section, and means responsive to expansion of the filter pack for indicating the presence of water and/or automatically stopping the flow of liquid through the pipe line.

Further, according to the present invention there may be provided a reservoir for holding a stock of liquid for supply to other reservoirs, for example aircraft fuel tanks, said one reservoir being fitted with a pipe line for delivering liquid to said other reservoirs, which pipe line has joined in it a section as set out in the previous paragraph.

The filter pack may be included in an arrangement whereby, on expansion of it, the auxiliary channel is closed, and in such a case said responsive means may then include a main valve located in the main channel between the said two points and a valve actuating mechanism responsive to the liquid flow conditions in the auxiliary channel for closing the main valve when flow of liquid through the auxiliary channel ceases.

Some grades of filter packs of the kind specified are sufficiently sensitive to the absorption of a small quantity of water to seal themselves against further flow of liquid through them. In consequence, when a filter pack of these grades are included in an arrangement as set out in the previous paragraph, the self-sealing of the filter pack itself is used to close the auxiliary channel. When other grades of filter pack are included in such an arrangement, the arrangement will include a valve for closing the auxiliary channel on expansion of the filter pack.

The valve actuating mechanism responsive to the liquid flow conditions in the auxiliary channel may comprise a venturi tube mounted in the auxiliary channel upstream of the filter pack, and a valve actuating mechanism for the main valve including a spring biasing means operating to close the valve and means responsive to the difference between the liquid/pressures in the main channel on the inlet side of the valve and at a point in the venturi tube in the auxiliary channel, for opposing the action of the biasing means and opening the main valve when the difference exceeds a predetermined amount. Said pressure difference responsive means may comprise a flexible bellows or diaphragm open on one side to the liquid in the chain channel at the inlet side of the valve, a liquid conduit interconnecting the space on the other side of the bellows or diaphragm with the liquid at a point along the venturi tube in the auxiliary channel, and a spring for extending the bellows or diaphragm and closing the valve when the pressures on either side are equal.

Alternatively the valve actuating mechanism may comprise means for supplying liquid under pressure to the mechanism under the control of a further valve or valves in the auxiliary channel operated by the flow of liquid through the auxiliary channel and/or expansion of the filter pack for supplying liquid from the auxiliary channel under pressure to close the main valve when the liquid flow in the auxiliary channel ceases and/or the filter pack expands, and to maintain the main valve open while the liquid flow in the auxiliary channel continues. The liquid may be supplied from the auxiliary channel to either side of a flexible bellows or diaphragm movement of which causes operation of the main valve, the further valve(s) controlling the supply of liquid to the appropriate side of the bellows or diaphragm to open and close the main valve under the appropriate conditions.

The main valve is preferably of a balanced type in order that its operation is not affected by the liquid pressure on either side of it. For example, it may be a butterfly valve, which, where the pipe line is of circular cross section, includes a valve member of elliptical cross section the length of the minor axis of which is equal to the internal diameter of the pipe line. The valve member is mounted for rotation about its minor axis, and about a diameter of the cross section of the pipe line, so that when the plane of the valve member is parallel to the longitudinal axis of the pipe line the valve is open and on rotation through an angle, for example, 30°–40°, the valve is closed.

While the section of the pipe line in which the apparatus is incorporated will usually be of rigid construction, the remainder of the pipe line into which it is joined may be wholly or in part flexible.

As will be apparent from the examples described below the apparatus will usually be designed to operate when the liquid flows in only one of the two possible directions in the main channel and in the auxiliary channel, and where this is so terms such as "the inlet side of a valve" and "upstream," are used with reference to the normal direction of liquid flow in the said channels.

Two embodiments of an oil pipe line control in accordance with the present invention will now be described with reference to the accompanying drawings.

Figure I of the drawing is a sectional view of a form of our device employing a vacuum control.

Figure II is a cross-sectional view along the lines II—II of Figure I.

In the example, the section of round pipe line 1 is provided with a lateral pipe 2 forming an auxiliary channel interconnecting two points spaced apart along the main oil flow channel provided by the pipe line section. In the following description it will be assumed that the oil flow in normal operation takes place only in one predetermined direction through the main channel. This direction is indicated by an arrow. Between the said two points in the main channel, there is mounted the valve member 3 of a butterfly valve. This valve member 3 consists of an elliptical plate, the length of the minor axis of which is equal to the diameter of the cross-section of the pipe line. The valve member 3 is mounted on a shaft 4 in bearings positioned diametrically opposite one another in the wall of the pipe line section so that the valve member can rotate about its minor axis. When the plane of the valve member lies parallel to the longitudinal axis of the pipe line, it presents negligible obstruction to the liquid flow through the main channel, and, if the valve member is rotated through approximately 30° from that position, it increasingly obstructs the main channel until it finally stops the flow altogether. The movement of the valve member is controlled by a rigid rod 5 pivotally connected at one end to a connector member 6 spaced along the major axis of the valve member from the center, and at the other end, to the moving end of a flexible bellows 7, which is secured to the end plate 8 of a cylinder 9 attached to the wall of the pipe line and positioned upstream of the valve member. The bellows 7 contains a spring 10 which extends the bellows when the fluid pressures inside and outside the bellows 7 are equal and consequently by means of the rod 5 forces the valve member 3 into the position in which it closes the main channel.

The upstream end of the lateral pipe 2 which forms the auxiliary channel diverges at only a small angle from the main channel. A venturi tube 11 is mounted in the bore of the lateral pipe 2, and from the outlet of the venturi tube, oil flows to a filter pack 12 of the kind specified. The filter pack 12 consists of a large number of annular sheets 13 of specially impregnated filter paper held between a pair of end plates 14 and 15 and supported by a rod 16 of triangular section passing down the central channel 30 of the filter pack. The external diameter of the filter papers forming the pack is less than the internal diameter of the part of the pipe 2 in which it is mounted, so that an annular channel 31 is left between the wall of the pipe 2 and the external surface of the filter pack 12. The pipe 2 bends beyond the filter pack at nearly a right angle to rejoin the pipe line section 1, but a short sealed branch arm 17 is provided which is in effect an extension of the part in which the filter pack is mounted. The closure 18 at the end of the branch arm 17 incorporates a support section 32 for the end plate 15 of the filter pack 12. This end plate 15 also closes the bore of pipe 2 at the downstream end of the filter pack apart from a central opening in the end plate 15 which forms a continuation of the central channel 30 through the filter pack. The triangular section rod 16 supporting the filter pack passes through the central opening in the downstream end plate 15. A valve member 19 is formed integrally on the end of the rod 16, which member by movement towards the end plate 15 becomes seated against the outer face of the end plate and closes the central opening in the end plate. A spring 20 is provided which tends to hold the valve member 19 away from the end plate 15 and holds the filter pack 12 in compression. An O-ring seal 100 is mounted in a groove on the outer surface of the support 32.

A further valve member 101 formed on the rod 16 is provided as a safety feature so that if the plates 14 and 15 are inserted without a pack 12 between them the opening in the end plate 15 is closed by the valve member 101 coming up against the end plate under the pressure exerted by the spring 20.

The other end plate 14 of the filter pack is rigidly connected to the triangular sectioned rod 16, and blocks the entrance to the central channel through the filter pack 12. It is a slide fit in the bore of pipe 2, but is provided with holes near the periphery permitting flow of oil into the annular space between the external surface of the filter pack and the wall of the pipe 2.

One or more small channels in the throat of the venturi tube 11 are connected by piping 21 to the interior of the bellows 7.

In operation, as long as the filter pack 12 is dry, the spring 20 forces the valve member 19 on the triangular rod 16 away from its seat, thus keeping the downstream end of the central channel through the filter pack 12 open. With no oil in the pipe line, the main valve will be closed by the action of the bias spring 10 within the bellows 7 as the air pressure inside and outside the bellows will be equal. On pumping dry oil into the pipe line, it will therefore initially flow only through the auxiliary channel formed by pipe 2, passing through the venturi tube through the openings in the upstream end plate 14 of the filter pack 12 to the annular space 31 between the external surface of the pack and the wall of the pipe 2 through the filter pack into the central channel 30 out through the opening in downstream end plate 15 past the valve member 19 back through the remainder of the auxiliary channel into the main channel downstream of the main valve member 3. The bellows 7 associated with the main valve member 3 will now be subject externally to the pressure of the oil on the upstream side. The interior of the bellows however is subject only to the lower pressure of the oil as it flows through the throat of the venturi tube and the compression of the bias spring 10 is arranged so that this difference under normal operating pressures is sufficient to overcome the spring, depress the bellows and move the main valve member 3 to an open position.

These conditions are maintained unless the oil contains sufficient water which when absorbed on the filter pack 12 causes it to expand. The expansion of the pack will cause the upstream end plate 14 to move away from the downstream end plate 15, and after the absorption of only a small quantity of water, the movement is sufficient to overcome the spring 20 holding the valve member 19 away from the face of end plate 15 at the downstream end of the central channel and thus to close the auxiliary channel. As flow through the venturi tube decreases, the oil pressure inside the bellows 7 increases, towards the same value as the pressure at the upstream side of the main valve, until the pressure difference is insufficient to overcome the bias spring 10, whereupon the bellows 7 expand closing the main valve member 3. The whole action can be made to be nearly instantaneous so that only a very small quantity of water can flow past before the main channel is closed. The larger the percentage of water in the oil, the quicker the filter expands and consequently the main valve member 3 is closed.

If the filter pack should become clogged with material other than water, the apparatus again operates to close the main valve so that oil cannot be passed through the main channel when the pack is inoperative due to clogging. As the filter pack starts to clog the flow through the auxiliary channel will decrease for a given pressure. This will cause the liquid pressure inside the bellows to increase, owing to the reduced rate of flow through the venturi tube, and the main valve will start to close, causing a partial obstruction of the main channel. This will increase the pressure at the upstream end of the auxiliary channel which will tend to restore the rate of flow through the filter pack. Further clogging, however, will eventually close the main valve member entirely, when the condition of the pack is such that the full operating pressure cannot restore flow through it. As flow cannot now take place through either channel, the need to replace the filter pack will be evident to the operators in charge of the apparatus.

The filter pack 16 can be replaced by unsealing the end of the branch arm by freeing the closure 18, after shutting off the oil flow and withdrawing the filter pack on its support.

In the embodiment described it may be possible to dispense with the valve at the downstream end of the filter pack, if the filter material is of a grade such that, on absorption of a small quantity of water, the pressure in the pack is sufficient to seal it against further oil flow. In such a case, it will be evident that the valve at the downstream end is redundant and need not be included.

In all cases the expansion of the filter pack may also, if required, cause the actuation of some indicating device to give warning that it has expanded and that water is present.

It is also possible to arrange that the expansion of the filter pack switches off the pump for causing the flow through the main channel, in addition to or instead of closing a valve in the main channel.

One particular application of the pipe line sections according to the present invention is in aircraft refuelling systems, where it is essential to ensure that the fuel passed to the aircraft tanks is free from water. In hydrant refuelling systems, such a section may therefore be included in the outlet line from a pump or pumps to prevent the passage of contaminated fuel to the hydrant supply lines. Further, such sections may be incorporated in each hydrant dispenser so as to provide individual control of contamination of fuel being supplied to an aircraft. In mobile refuelling units, too, such sections may be incorporated in the fuel dispensing arrangements.

We claim as our invention:

A control apparatus for hydrocarbon pipe lines comprising: a main pipe line section, a balanced main valve therein, a pipe connected to said pipe line section at both the upstream side and downstream side of said main valve, a water sensitive filter pack in said pipe, said filter pack comprising a central longitudinally mounted stem piece having a hollow expansible water sensitive filter element loosely mounted thereon, and a spring loaded valve means mounted at one end of said stem piece for controlling the passage of fluid axially through said filter pack, a venturi located in said pipe line upstream from said filter pack, a valve seat cooperating with said valve means, said valve means being operable to close upon expansion of said filter pack, means associated with said balanced main valve for moving the same in response to fluid pressure, and a conduit leading from the throat of said venturi to said means adapted to transmit pressure from said throat to said means whereby to cause said main valve to move upon expansion of the filter element of said filter pack.

References Cited in the file of this patent

UNITED STATES PATENTS

| | | |
|---|---|---|
| 2,104,519 | Hurn | Jan. 4, 1938 |
| 2,417,994 | Sheets | Mar. 25, 1947 |
| 2,588,136 | Mallory | Mar. 4, 1952 |